US011472152B2

(12) United States Patent
Grieser-Schmitz et al.

(10) Patent No.: US 11,472,152 B2
(45) Date of Patent: Oct. 18, 2022

(54) METHOD FOR PRODUCING INSULATED PIPES

(71) Applicant: BASF SE, Ludwigshafen am Rhein (DE)

(72) Inventors: Christof Grieser-Schmitz, Lemfoerde (DE); Carsten Ellersiek, Lemfoerde (DE); Alex Popov, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 108 days.

(21) Appl. No.: 16/617,406

(22) PCT Filed: May 29, 2018

(86) PCT No.: PCT/EP2018/064016
§ 371 (c)(1),
(2) Date: Nov. 26, 2019

(87) PCT Pub. No.: WO2018/219916
PCT Pub. Date: Dec. 6, 2018

(65) Prior Publication Data
US 2021/0122134 A1    Apr. 29, 2021

(30) Foreign Application Priority Data

May 30, 2017    (EP) .................................... 17173464

(51) Int. Cl.
| | | |
|---|---|---|
| *B05D 7/22* | (2006.01) | |
| *B32B 1/08* | (2006.01) | |
| *B32B 5/20* | (2006.01) | |
| *B32B 7/12* | (2006.01) | |
| *B32B 27/32* | (2006.01) | |
| *B32B 27/40* | (2006.01) | |
| *F16L 59/14* | (2006.01) | |
| *C08K 5/00* | (2006.01) | |

(52) U.S. Cl.
CPC ................ *B32B 1/08* (2013.01); *B05D 7/222* (2013.01); *B32B 5/20* (2013.01); *B32B 7/12* (2013.01); *B32B 27/32* (2013.01); *B32B 27/40* (2013.01); *F16L 59/143* (2013.01); *B05D 2254/02* (2013.01); *B05D 2503/00* (2013.01); *B32B 2266/0278* (2013.01); *B32B 2307/304* (2013.01); *B32B 2307/542* (2013.01); *B32B 2597/00* (2013.01); *C08K 5/0025* (2013.01)

(58) Field of Classification Search
CPC ... B05D 1/02; B05D 1/26; B05D 1/28; B05D 1/30; B05D 1/36; B05D 7/146; B05D 7/52; B05D 2202/10; B05D 2201/15; B05D 7/22; B05D 7/225; B05D 2254/02; B05D 2254/04; B05D 2503/00; F16L 59/143; F16L 59/14; B29C 44/12; B29C 44/1228; B29C 44/18; B29C 44/1242; B29C 44/129; B29C 44/1295

See application file for complete search history.

(56) References Cited

U.S. PATENT DOCUMENTS

| | | | | |
|---|---|---|---|---|
| 6,010,650 A | * | 1/2000 | Schmiade | ............. F16L 59/143 |
| | | | | 264/45.7 |
| 9,421,571 B2 | * | 8/2016 | Ellersiek | ............... B29C 67/246 |

FOREIGN PATENT DOCUMENTS

| | | | | |
|---|---|---|---|---|
| CA | 2879364 A1 | * | 1/2014 | ............. C08J 9/141 |
| EP | 0865893 A2 | | 9/1998 | |
| EP | 0960723 A2 | | 12/1999 | |
| EP | 1141613 B1 | | 8/2002 | |
| EP | 1516720 A1 | | 3/2005 | |
| EP | 1595904 A2 | | 11/2005 | |
| EP | 1428848 B1 | | 6/2006 | |
| EP | 1777051 B1 | | 7/2008 | |
| EP | 2143539 A1 | | 1/2010 | |
| EP | 2435243 A1 | | 4/2012 | |
| JP | 2006298970 A | | 11/2006 | |
| WO | 0039497 A1 | | 7/2000 | |
| WO | 0118087 A1 | | 3/2001 | |
| WO | WO-2010149272 A1 | * | 12/2010 | ............... B32B 5/22 |
| WO | 2011045139 A1 | | 4/2011 | |
| WO | 2014012877 A1 | | 1/2014 | |
| WO | 2015091451 A1 | | 6/2015 | |

OTHER PUBLICATIONS

English language translation of the International Preliminary Examination Report for PCT/EP2018/064016, dated Aug. 27, 2019, 8 pages. (Year: 2019).*

(Continued)

*Primary Examiner* — William P Fletcher, III
(74) *Attorney, Agent, or Firm* — Armstrong Teasdale LLP

(57) ABSTRACT

Described herein is a process for producing insulated pipes including providing a media pipe and a film hose continuously formed from a film or a media pipe and a jacketing pipe, wherein the media pipe is arranged inside the film hose or the jacketing pipe and a slot is formed between the media pipe and the film hose or jacketing pipe, wherein an adhesion promoter is applied to the surface of the media pipe facing the film hose or the jacketing pipe, introducing a polyurethane system at least including an isocyanate component (a) including at least one isocyanate, a polyol component (b), and at least one catalyst into the slot before the adhesion promoter is fully cured, and foaming and curing the polyurethane system. Also described herein are insulated pipes obtainable or obtained by such a process.

8 Claims, No Drawings

(56) References Cited

OTHER PUBLICATIONS

Gibson, L. J.; Ashby, M. F. The Mechanics of Three-Dimensional Cellular Materials. Proc. R. Soc. Lond. A 1982, 382 (1782), 43-59. (Year: 1982).*

Thompson, M. S.; McCarthy, I. D.; Lidgren, L.; Ryd, L. Compressive and Shear Properties of Commercially Available Polyurethane Foams. Journal of Biomechanical Engineering 2003, 125 (5), 732-734. (Year: 2003).*

Pettarin, V.; Fasce, L. A.; Frontini, P. M. Assessment of Multiaxial Mechanical Response of Rigid Polyurethane Foams. Journal of Materials Engineering and Performance 2013, 23 (2), 477-485. (Year: 2013).*

Database WPI Week 200681 Thomson Scientific, London, GB; AN 2006-793212 XP002775879. 5 pages.

\* cited by examiner

METHOD FOR PRODUCING INSULATED PIPES

CROSS-REFERENCE TO RELATED APPLICATIONS

This application is a U.S. National Phase Application of International Patent Application No. PCT/EP2018/064016, filed May 29, 2018, which claims the benefit of priority to European Patent Application No. 17173464.3, filed May 30, 2017, the entire contents of which are hereby incorporated by reference herein.

FIELD OF THE INVENTION

BACKGROUND

The present invention relates to a process for producing insulated pipes comprising providing a media pipe and a film hose continuously formed from a film or a media pipe and a jacketing pipe, wherein the media pipe is arranged inside the film hose or the jacketing pipe and a slot is formed between the media pipe and the film hose or jacketing pipe, wherein an adhesion promoter is applied to the surface of the media pipe facing the film hose or the jacketing pipe, introducing a polyurethane system at least comprising an isocyanate component (a) comprising at least one isocyanate, a polyol component (b) and at least one catalyst into the slot before the adhesion promoter is fully cured and foaming and curing the polyurethane system. The present invention further relates to insulated pipes obtainable or obtained by a process according to the invention.

It is known in principle from the prior art that polyurethane foams can be used as insulation material and composite bodies constructed in layerwise fashion are also known per se.

EP 2 435 243 A1 discloses a process for producing a foam composite element comprising the steps of providing an outerlayer, applying an adhesion promoter layer to the outerlayer, wherein the adhesion promoter layer comprises a modified isocyanate, and applying a polyurethane- and/or polyisocyanurate-comprising foam layer to the adhesion promoter layer. Upon application the modified isocyanate in the adhesion promoter layer has a content of free isocyanate groups of 10% to 25%. The invention further relates to the use of a modified isocyanate having a content of free isocyanate groups of 10% to 25% as an adhesion promoter in the production of foam composite elements and to foam composite elements produced by the process according to the invention.

EP 1 516 720 A1 discloses a process for producing a composite element constructed from a first outerlayer, a reactive adhesion promoter layer comprising polyurethane having a density of 400 to 1200 g/l, a foam layer comprising polyisocyanurate having a density of 30 to 100 g/l, optionally a second reactive adhesion promoter layer comprising polyurethane having a density of 400 to 1200 g/l, and a second outerlayer, as well as such composite elements themselves.

WO 2015/091451 A1 discloses a process for producing a composite element comprising at least the steps of providing an outerlayer; applying a composition Z1 comprising at least one isocyanate-reactive compound to the outerlayer; and applying a composition Z2 suitable for producing a polyurethane and/or polyisocyanurate foam to the previously applied layer, as well as composite elements obtainable or obtained by such a process.

WO 2011/045139 A1 discloses insulation boards comprising a polyisocyanurate foam layer having a layer surface adhesively bonded to an end face using a polyisocyanurate adhesive, wherein before completion of the polymerization of both the layer surface and the polyisocyanurate adhesive the polyisocyanurate adhesive was placed between the layer surface and the end face, wherein the polyisocyanurate adhesive has an average thickness of 10 to 500 µm, as well as a process for producing such boards.

Pipes insulated with polyurethane foams are also known in the prior art and described for example in EP 1 141 613 B1, EP A 865 893, EP 1 777 051 B1, EP 1 595 904 A2, WO 00/39497, WO 01/18087 A1, EP 2 143 539 A1 and EP 1 428 848 B1. Insulated pipeline systems are joined together from individual pipe segments. Pipe lengths of 6 m, 12 m and 16 m are used as standard. Any intermediate lengths required are specially manufactured or cut to size from existing finished product. The individual pipe segments are welded and post-insulated in the region of the weld seam with existing sleeving techniques. These sleeve joins conceal a greater damage potential than the pipe product itself. This difference results from the fact that the pipe lengths are produced under defined controllable conditions in production facilities. The sleeve joins are often produced under time pressure in situ on the construction site in wind and weather. Influences such as temperature, contamination and moisture often affect the quality of the sleeve joins. Furthermore the number of sleeve joins represents a large cost factor in the installation of pipeline systems.

The majority of individual pipes are produced using the discontinuous pipe-in-pipe production method. In the context of this process the media pipe, generally made of steel, is provided with star-shaped spacers to center the inner pipe. The media pipe is pushed into the outer jacketing pipe, generally made of polyethylene, thus resulting in an annular slot between the two pipes. This annular slot is filled with polyurethane foam on account of its excellent insulating properties. To this end, the slightly inclined double pipe is fitted with end caps provided with venting holes. The liquid reaction mixture is subsequently introduced into the annular slot by means of a polyurethane metering machine and in still-liquid form flows downward in the pipe slot until the reaction commences. From this point on further distribution is achieved through the foam of slowly increasing viscosity flowing until the material has reacted to completion.

It is therefore desirable in the pipe processing industry to install as few sleeves joins as possible based on the length of a conduit. Continuous processes for producing insulated pipes are therefore often employed.

Insulated pipes are used for transporting various media, in particular oil and hot water for supplying district heat. A decisive criterion for the configuration of district heating networks are the composite properties of the insulated pipes between the media pipe and the insulation material. According to the determining standard for rigid pipes DIN EN 253:2015-12 the axial shear strength at 23° C. must be at least 0.12 MPa. For flexible pipes it must be at least 0.09 MPa for plastic pipes according to DIN EN 15632-2:2010-6 and at least 0.12 MPa for metal pipes according to DIN EN 15632-4:2009-1.

Particularly in the continuous production of pre-insulated pipes it is difficult to safely achieve these values as a consequence of the production process. This often results in defective production with insufficient adhesion which in turn leads to production outages, disposal costs and additional consumption of materials.

BRIEF DESCRIPTION

It is an object of the present invention to provide a process for producing insulated pipes to obtain pipes featuring a uniform overall bulk density over the pipe length and a homogeneous foam structure over the pipe cross section as well as small cell diameters of the polyurethane foam comprised therein and thus a low thermal conductivity. It is a further object of the present invention to provide a process for producing insulated pipes to obtain pipes exhibiting a high stability, in particular a high axial shear strength. It shall further be possible to achieve continuous production of insulated pipes having large diameters and/or high bulk densities of the insulating material.

These objects are achieved according to the invention by a process for producing insulated pipes, comprising the steps of:
(A) providing a media pipe and a film hose continuously formed from a film or a media pipe and a jacketing pipe, wherein the media pipe is arranged inside the film hose or the jacketing pipe and a slot is formed between the media pipe and the film hose or jacketing pipe,
wherein an adhesion promoter has been applied to the surface of the media pipe facing the film hose or the jacketing pipe,
(B) introducing a polyurethane system at least comprising an isocyanate component (a) comprising at least one isocyanate, a polyol component (b) and at least one catalyst into the slot before the adhesion promoter is fully cured and
(C) foaming and curing the polyurethane system.

DETAILED DESCRIPTION

It has been found that, surprisingly, the application of an additional adhesion promoter to the media pipe shortly before application of the insulating foam results in a marked increase in axial shear strength. In some cases axial shear strength was able to be more than doubled compared to insulated pipes produced in a comparable process without the application of an adhesion promoter. Unless otherwise stated axial shear strength is determined according to DIN EN 253:2015-12 in the context of the present invention.

According to the invention the process comprises the steps (A), (B) and (C). In step (A) a media pipe is employed, wherein an adhesion promoter has been applied to the surface of the media pipe facing the film hose or the jacketing pipe. A multiplicity of adhesion promoters may in principle be employed in the context of the present invention as long as it is ensured that the introducing in step (B) can take place before the adhesion promoter is fully cured.

Suitable adhesion promoters are known per se to those skilled in the art. Examples of adhesion promoters employable in the context of the present invention include reactive adhesives such as in particular two-component polyurethane adhesives. However, it is also possible to employ polyolefinic adhesion promoters, preferably made of polyethylene homopolymer, ethylene ethyl acrylate ("EAA"), epoxy resins, polyurea or ethylene methacrylic acid ("EMMA"). Compact to slightly foaming adhesion promoters may be used for example.

It is preferable when the adhesion promoter employed according to the invention is a 2-component system. In a further embodiment the present invention therefore relates to a process as described hereinabove, wherein the adhesion promoter is a 2-component system.

Preferably employed in the context of the present invention are adhesion promoters based on polyurethanes, more preferably polyurethanes comprising at least one isocyanate component and a polyol component.

In a further embodiment the present invention therefore relates to a process as described hereinabove, wherein the adhesion promoter is selected from the group consisting of adhesion promoters based on polyurethanes.

In a further embodiment the present invention also relates to a process as described hereinabove, wherein the adhesion promoter comprises at least one isocyanate component and a polyol component.

It has been found that particularly advantageous properties are achievable when the employed adhesion promoter is composed of the same components as the polyurethane system introduced in step (B).

According to the invention the bulk density of the adhesion promoter may be varied over wide ranges. The adhesion promoter preferably has a bulk density determined without solids in the range from 400 to 1200 kg/m$^3$, more preferably in the range from 500 to 1100 kg/m$^3$, particularly preferably in the range from 600 to 1000 kg/m$^3$. In a further embodiment the present invention therefore relates to a process as described hereinabove, wherein the adhesion promoter has a bulk density determined without solids in the range of 400 to 1200 kg/m$^3$.

The individual steps of the process according to the invention are elucidated in detail below:

Step (A) of the process according to the invention comprises providing a media pipe and a film hose continuously formed from a film or a media pipe and a jacketing pipe, wherein the media pipe is arranged inside the film hose or the jacketing pipe and a slot is formed between the media pipe and the film hose or jacketing pipe, wherein an adhesion promoter has been applied to the surface of the media pipe facing the film hose or the jacketing pipe.

The adhesion promoter may be applied to the media pipe in any manner known to those skilled in the art, for example by spraying or spread coating. According to the invention it is preferable when the adhesion promoter has been uniformly applied in a very thin layer. For example the applied adhesion promoter layer may have an average thickness in the range from 6 µm to 3000 µm, preferably in the range from 10 µm to 2500 µm, particularly preferably in the range from 20 µm to 2000 µm, very particularly preferably in the range from 30 µm to 1500 µm.

A further embodiment of the present invention therefore relates to a process as described hereinabove, wherein the adhesion promoter is applied by spraying or spread coating.

Typically the adhesion promoter is uniformly applied to the media pipe so that for example at least 50% of the surface of the media pipe to which the adhesion promoter is applied is covered, preferably at least 70%, more preferably at least 90%.

In a further embodiment the present invention therefore relates to a process as described hereinabove, wherein the adhesion promoter covers a proportion of the surface of the media pipe facing the film hose or jacketing pipe in the range from 50% to 100% of the surface, for example in the range from 80% to 100% of the surface, more preferably in the range from 80% to 100% of the surface, particularly preferably in the range from 90% to 100% of the surface.

The at least one media pipe which according to the invention has a smaller diameter than the film hose or the jacketing pipe and also than the jacketing pipe formed in step (D) of the process according to the invention is arranged inside the jacketing pipe such that a slot is formed between the media pipe and the film hose/jacketing pipe. The polyurethane system is introduced into this slot in the step (B)

according to the invention. The formed slot has different shapes depending on how many media pipes are present according to the invention.

The at least one media pipe employed according to the invention is generally a steel pipe having an external diameter of for example 1 to 70 cm, preferably 4 to 70 cm, particularly preferably 10 to 70 cm and very particularly preferably 20 to 70 cm. If two or more media pipes are present these may have identical or different external diameters. The length of the at least one media pipe is for example 3 to 24 m, preferably 6 to 16 m. It is more preferable when the at least one media pipe is provided as an off-the-reel product with a length of for example 50 to 1500 m.

In the continuous performance of the process according to the invention the at least one media pipe is provided as an off-the-reel product for example. The at least one media pipe may also be provided as cut lengths.

Step (A) of the process according to the invention comprises providing at least one media pipe and a film hose continuously formed from a film or at least one media pipe and a jacketing pipe.

Provided a film hose is used an elongate film is preferably unwound continuously from a roll and optionally joined together to form a film hose by methods known to those skilled in the art, for example welding or gluing. In a preferred embodiment of the process according to the invention this joining is carried out in the double belt in which the at least one media pipe is also continuously supplied. The film is preferably supplied via a forming shoulder/film shoulder. A circular film hose is preferably formed.

The film may comprise at least one ply of a thermoplastic which preferably has a diffusioninhibiting effect with respect to the cell gases and oxygen. The film preferably also comprises at least one ply of metal, for example aluminum. Films suitable according to the invention are known from EP 0 960 723 A2 for example.

In a further embodiment the present invention therefore relates to a process as described hereinabove, wherein the material from which the jacketing pipe or the film hose is formed is a thermoplastic.

The film employed according to the invention preferably has a width which makes it possible to form a corresponding film hose having an internal diameter of generally 6 to 90 cm, preferably 12 to 90 cm, particularly preferably 19 to 90 cm, very particularly preferably 35 to 90 cm. This film is preferably provided as an off-the-reel product.

The film employed according to the invention may be formed from any material appearing suitable to those skilled in the art, for example polyethylene.

The film employed according to the invention generally has any thickness appearing suitable to those skilled in the art, for example 5 to 150 μm.

In step (A) of the process according to the invention the at least one media pipe is arranged inside the film hose such that a slot is formed between the at least one media pipe and the film hose or between the at least one media pipe and the jacketing pipe. It is particularly preferable for the one media pipe to be arranged in the center of the, preferably circular, film hose or media pipe to form a concentric slot. In the case of more than one media pipe these are preferably arranged symmetrically in the film hose.

The jacketing pipe generally has a thickness of 1 to 30 mm. The internal diameter of the jacketing pipe is generally 6 to 140 cm, preferably 10 to 120 cm. The length of the jacketing pipe is for example 1 to 24 m, preferably 6 to 16 m.

The jacketing pipe may optionally consist of a plurality of layers which may be combined during extrusion to produce the jacketing pipe. One example thereof is the introduction of multilayered films between the polyurethane foam and the jacketing pipe, wherein the film comprises at least one metallic ply for improving the barrier effect. Suitable jacketing pipes of this type are described in EP 0 960 723 A2.

In a particularly preferred embodiment the insulated pipe produced according to the invention is an insulated composite jacketed pipe for underground district heating networks which meets the requirements of DIN EN 253:2015-12.

According to the invention the introducing of the polyurethane system may be carried out at one end of the pipe or in the middle or at any point between one end and the middle of the pipe in each case in the slot present between the media pipe and the jacketing pipe/film hose.

Step (B) of the process according to the invention comprises introducing a polyurethane system at least comprising an isocyanate component (a) comprising at least one isocyanate, a polyol component (b) and at least one catalyst into the slot before the adhesion promoter is fully cured.

The introducing of the polyurethane system into the annular slot between the media pipe and the jacketing pipe in step (B) is carried out for example using a polyurethane metering machine known to those skilled in the art.

The introducing in step (B) of the process according to the invention may generally be carried out using any apparatus known to those skilled in the art, for example commercially available high pressure metering machines, for example from Hennecke GmbH, Cannon Deutschland GmbH or Krauss Maffei Kunststofftechnik GmbH.

During and after the introducing, the liquid reaction mixture, i.e. the polyurethane system according to the invention, flows down in the slot in still liquid form until onset of the polymerization reaction with foaming. From this point on further distribution is achieved through the foam of slowly increasing viscosity flowing until the material has reacted to completion.

The introducing of the polyurethane system is preferably carried out when the employed adhesion promoter is still sufficiently wet. In the context of the present invention the introducing of the polyurethane system is preferably carried out within a time after application of the adhesion promoter which is less than the fiber time of the adhesion promoter but at least before the adhesion promoter has fully reacted, i.e. is no longer tacky.

Polyurethane systems employable/preferably employed according to the invention are elucidated in detail hereinbelow. Employable as the isocyanate component (a) are the customary aliphatic, cycloaliphatic and in particular aromatic di- and/or polyisocyanates. It is preferable to employ diphenylmethane diisocyanate (MDI) and especially mixtures of diphenylmethane diisocyanate and polyphenylene-polymethylene polyisocyanates (crude MDI). The isocyanates may also be modified, for example through incorporation of uretdione, carbamate, isocyanurate, carbodiimide, allophanate and in particular urethane groups.

The isocyanate component (a) may also be employed in the form of polyisocyanate prepolymers. These prepolymers are known from the prior art. Production is carried out in a manner known per se when polyisocyanates (a) described hereinabove are reacted with compounds having isocyanate-reactive hydrogen atoms, preferably with polyols, at temperatures of for example about 80° C. to afford polyisocyanate prepolymers. The polyol/polyisocyanate ratio is generally chosen such that the NCO content of the prepolymer is 8% to 25% by weight, preferably 10% to 22% by weight, particularly preferably 13% to 20% by weight.

It is especially preferable according to the invention to employ crude MDI as the isocyanate component.

In a preferred embodiment the isocyanate component (a) is chosen such that it has a viscosity of less than 800 mPas, preferably from 100 to 650, particularly preferably from 120 to 400, in particular from 180 to 350 mPas, measured according to DIN 53019 at 20° C.

In the polyurethane system employed according to the invention the at least one polyol is preferably a polyol mixture (b) which generally comprises polyols as constituent (b1) and optionally chemical blowing agents as constituent (b2). The polyol mixture (b) generally comprises physical blowing agents (b3).

The viscosity of the polyol mixture (b) employed according to the invention (but without physical blowing agents (b3)) is generally 200 to 10000 mPas, preferably 500 to 9500 mPas, particularly preferably 1000 to 9000 mPas, very particularly preferably 2500 to 8500 mPas, in particular 3100 to 8000 mPas, in each case measured according to DIN 53019 at 20° C. In a particularly preferred embodiment the process according to the invention employs a polyol mixture (b) (but without physical blowing agents (b3)) having a viscosity of more than 3000 mPas, for example 3100 to 8000 mPas, in each case measured according to DIN 53019 at 20° C.

The present invention therefore preferably relates to the process according to the invention wherein the at least one polyol (b) employed is a polyol mixture (b) (but without physical blowing agents (b3)) having a viscosity of more than 3000 mPas, for example 3100 to 8000 mPas, in each case measured according to DIN 53019 at 20° C. The polyol mixture (b) generally comprises physical blowing agents (b3). However, the addition of physical blowing agent significantly reduces viscosity. It is therefore an essential feature of the invention that what is stated hereinabove in respect of the viscosity of the polyol mixture (b) relates to the viscosity of the polyol mixture (b) without addition of physical blowing agents (b3) even if said mixture does comprise physical blowing agents.

Contemplated polyols (constituent b1) generally include compounds having at least two isocyanate-reactive groups, i.e. having at least two isocyanate-reactive hydrogen atoms. Examples thereof are compounds having OH groups, SH groups and/or NH groups. Preferably employed as polyols (constituent b1) are compounds based on polyesterols and polyetherols. The functionality of the polyetherols and/or polyesterols is generally 1.9 to 8, preferably 2.4 to 7, particularly preferably 2.6 to 6. The polyols (b1) have a hydroxyl number of generally greater than 20 mg KOH/g, preferably greater than 30 mg KOH/g, particularly preferably greater than 40 mg KOH/g. The upper limit of the hydroxyl number has proven to be in general 700 mg KOH/g, preferably 600 mg KOH/g, particularly 500 mg KOH/g, very particularly 400 KOH/g. The abovementioned OH numbers relate to the entirety of the polyols (b1) which does not preclude individual constituents of the mixture from having higher or lower values.

Component (b1) preferably comprises polyether polyols produced from one or more alkylene oxides having 2 to 4 carbon atoms in the alkylene radical by known processes, for example by anionic polymerization with alkali metal hydroxides, such as sodium or potassium hydroxide, or alkali metal alkoxides, such as sodium methoxide, sodium or potassium ethoxide or potassium isopropoxide, as catalysts and with addition of at least one starter molecule comprising 2 to 8, preferably 3 to 8, reactive hydrogen atoms in bonded form, or by cationic polymerization with Lewis acids, such as antimony pentachloride, boron fluoride etherate inter alia or fuller's earth as catalysts.

Suitable alkylene oxides are for example tetrahydrofuran, 1,3-propylene oxide, 1,2- and 2,3-butylene oxide, styrene oxide and preferably ethylene oxide and 1,2-propylene oxide. The alkylene oxides may be used individually, alternately in succession or as mixtures. Contemplated starting molecules include alcohols, for example glycerol, trimethylolpropane (TMP), pentaerythritol, sugar compounds such as sucrose, sorbitol, and amines such as methylamine, ethylamine, isopropylamine, butylamine, benzylamine, aniline, toluidine, toluenediamine, naphthylamine, ethylenediamine (EDA), diethylenetriamine, 4,4'-methylenedianiline, 1,3-propanediamine, 1,6-hexanediamine, ethanolamine, diethanolamine, triethanolamine and the like.

Also employable as starter molecules are condensation products of formaldehyde, phenol and diethanolamine/ethanolamine, formaldehyde, alkylphenols and diethanolamine/ethanolamine, formaldehyde, bisphenol A and diethanolamine/ethanolamine, formaldehyde, aniline and diethanolamine/ethanolamine, formaldehyde, cresol and diethanolamine/ethanolamine, formaldehyde, toluidine and diethanolamine/ethanolamine and formaldehyde, toluene diamine (TDA) and diethanolamine/ethanolamine and the like.

It is preferable to use glycerol, sucrose, sorbitol and TDA as the starter molecules.

Furthermore, the polyol mixture may optionally comprise chemical blowing agents as constituent (b2). Preferred chemical blowing agents are water or carboxylic acids, in particular formic acid. The chemical blowing agent is generally employed in an amount of 0.1 to 4% by weight, preferably of 0.2 to 2.0% by weight, and particularly preferably of 0.3 to 1.5% by weight, in each case based on the weight of component (b) (but without physical blowing agents (b3)).

As mentioned hereinabove the polyol mixture (b) generally comprises a physical blowing agent (b3). These are to be understood as meaning compounds which are dissolved or emulsified in the starting materials of polyurethane production and vaporize under the conditions of polyurethane formation. These include for example hydrocarbons, for example pentane, halogenated hydrocarbons, and other compounds, for example perfluorinated alkanes, such as perfluorohexane, fluorohydrocarbons (HFCs), hydrofluoroolefins (HFO) and ethers, esters, ketones and/or acetals. These are typically employed in an amount of 1% to 30% by weight, preferably 2% to 25% by weight, particularly preferably 3% to 20% by weight, based on the total weight of the components (b).

The present invention therefore preferably relates to the process according to the invention, wherein the polyurethane system is foamed with pentane, preferably cyclopentane, as a physical blowing agent.

In a preferred embodiment the polyol mixture (b) comprises crosslinkers as constituent (b4). Crosslinkers are to be understood as meaning compounds having a molecular weight of 60 to less than 400 g/mol and at least 3 isocyanate-reactive hydrogen atoms. One example thereof is glycerol.

The crosslinkers (b4) are generally employed in an amount of 0.5 to 10% by weight, preferably from 2 to 6% by weight, based on the total weight of the polyol mixture (b) (but without physical blowing agents (b3)).

In a further preferred embodiment the polyol mixture (b) comprises as constituent (b5) chain extenders used to increase crosslinking density. Chain extenders are to be understood as meaning compounds having a molecular weight of 60 to less than 400 g/mol and 2 isocyanate-reactive hydrogen atoms. Examples thereof are butanediol, diethylene glycol, dipropylene glycol and ethylene glycol.

The chain extenders (b5) are generally employed in an amount of 2% to 20% by weight, preferably from 4% to 15% by weight, based on the total weight of the polyol mixture (b) (but without physical blowing agents (b3)).

The components (b4) and (b5) may be employed in the polyol mixture individually or in combination.

In a further embodiment the present invention therefore relates to a process as described hereinabove, wherein the polyol component (b) comprises at least one compound selected from the group consisting of chemical blowing agents, crosslinkers, chain extenders, additives and/or physical blowing agents.

The polyurethane foams present as insulation materials according to the invention are obtainable by reaction of the polyurethane system according to the invention. In the reaction the at least one isocyanate component (a) and the at least one polyol (b), preferably the polyol mixture (b), are generally reacted in amounts such that the isocyanate index of the foam is 95 to 240, preferably 95 to 200, particularly preferably 100 to 180, very particularly preferably 100 to 160, in particular 105 to 149.

In a further embodiment the present invention therefore relates to a process as described hereinabove, wherein the reaction of the isocyanate component (a) with the polyol component (b) is performed at an index between 95 and 240.

In a preferred embodiment the components (a) and (b) of the polyurethane system are chosen such that the resulting foam has a compressive strength (at a bulk density of 60 kg/m$^3$) of greater than 0.2 N/mm$^2$, preferably greater than 0.25 N/mm$^2$, particularly preferably greater than 0.3 N/mm$^2$, in each case measured according to DIN 53421.

In the process according to the invention the total injected foam density is generally less than 80 kg/m$^3$, preferably less than 75 kg/m$^3$, particularly preferably less than 70 kg/m$^3$, very particularly preferably less than 65 kg/m$^3$, in particular less than 60 kg/m$^3$. The total injected foam bulk density is generally to be understood as meaning the total amount of introduced liquid polyurethane material based on the total volume of the foam-filled annular slot.

The process according to the invention may be carried out generally at any compaction appearing suitable to those skilled in the art. Compaction is to be understood as meaning the quotient of the total fill density of the tubular slot divided by the free-foamed core bulk density determined on an uncompacted foam body.

The present invention preferably relates to the process according to the invention wherein the reaction is performed at a compaction of less than 4.0, preferably less than 3.5, particularly preferably less than 3.0 and very particularly preferably less than 2.5.

The polyurethane system employed in step (B) of the process according to the invention preferably comprises at least one catalyst. According to the invention any catalysts appearing suitable to those skilled in the art may generally be employed.

Catalysts preferably employed according to the invention catalyze the blowing reaction, i.e. the reaction of diisocyanate with water. This reaction takes place predominantly before the actual polyurethane chain formation, i.e. the polymerization reaction, and therefore results in a fast reaction profile of the polyurethane system. Also preferably employable are catalysts which catalyze the polyurethane gel reaction.

Examples of catalysts employable according to the invention are selected from the group consisting of benzyldimethylamine (CAS No. 103-83-3), cyclohexyldimethylamine (CAS No. 98-94-2), 1-methylimidazole (CAS No. 616-47-7), hexane-1,6-diamine (CAS No. 124-09-4), or other known catalysts that accelerate the PUR reaction and mixtures thereof.

The catalysts preferred according to the invention may be added to the polyurethane system in any manner known to those skilled in the art, for example in pure form or as a solution, for example as an aqueous solution.

Based on the polyol component (b) (but without physical blowing agents (b3)) according to the invention the at least one catalyst is added in an amount of 0.01% to 5% by weight, preferably 0.5% to 5% by weight, particularly preferably 1% to 5% by weight, very particularly preferably 1.5% to 5% by weight, in particular 2% to 5% by weight.

The polyurethane system employed according to the invention may optionally also be admixed with additives (b6). Additives (b6) are to be understood as meaning the auxiliary and additive substances known and customary in the prior art but without physical blowing agents. Examples include for example surface-active substances, foam stabilizers, cell regulators, fillers, dyes, pigments, flame retardants, antistats, hydrolysis stabilizers and/or fungistatic and bacteriostatic substances. It should be noted that the above-mentioned general and preferred viscosity ranges of the component (b) relate to a polyol mixture (b) including optionally added additives (b6) (but without physical blowing agents (b3)).

Step (C) of the process according to the invention comprises foaming and curing of the polyurethane system.

According to the invention the foaming and curing are generally carried out at a component temperature of 18° C. to 40° C., preferably 18° C. to 35° C., particularly preferably 22° C. to 30° C.

According to the invention the foaming and curing generally is carried out at a surface temperature of 15° C. to 50° C., preferably 20° C. to 50° C., particularly preferably 25° C. to 45° C.

An insulated pipe at least comprising at least one media pipe, a film hose or jacketing pipe and an insulating layer of polyurethane foam between at least one media pipe and the film hose or between the media pipe and the jacketing pipe is obtained after step (C) of the process according to the invention.

The insulating layer generally has a thickness of 1 to 20 cm, preferably 3 to 20 cm, particularly preferably 5 to 20 cm. In a further preferred embodiment the insulating layer comprising polyurethane foam has a thermal conductivity of less than 27 mW/mK, preferably less than 26 mW/mK, particularly preferably less than 25 mW/mK, very particularly preferably less than 24 mW/mK, in particular less than 23 mW/mK, in each case measured according to EN ISO 8497.

Provided a film hose is used the process according to the invention preferably also comprises a step (D).

Step (D) of the process according to the invention comprises applying a layer of at least one material to the film hose to form a jacketing pipe.

In one embodiment at least one media pipe surrounded by an insulating layer of at least one polyurethane foam which in turn is surrounded by the film hose produced in step (A) is produced after step (C) of the process according to the invention. To form the jacketing pipe from at least one material said material is applied in step (D) of the process according to the invention. According to the invention generally any suitable material may be used as the jacketing pipe.

In a further embodiment of the process according to the invention the material from which the jacketing pipe is formed in step (D) is a thermoplastic.

The present invention therefore preferably relates to the process according to the invention, wherein the material from which the jacketing pipe is formed in step (D) is a thermoplastic, in particular polyethylene. According to the invention the applying of thermoplastics may be carried out by extrusion. Extrusion of thermoplastics to produce a layer, here the jacketing pipe, is known per se to those skilled in the art.

The applying in step (D) of the process according to the invention is generally performed at a temperature appearing to those skilled in the art to be suitable for extrusion of thermoplastics, for example above the melting temperature of the employed thermoplastic. Suitable temperatures are for example 180° C. to 220° C., preferably 190° C. to 230° C. or 180° C. to 230° C., preferably 190° C. to 220° C.

The jacketing pipe formed in step (D) of the process according to the invention generally has a thickness of 1 to 30 mm. According to the invention the internal diameter of the jacketing pipe depends on the diameter of the film hose and is for example 6 to 140 cm, preferably 10 to 120 cm, particularly preferably 115 to 90 cm.

The jacketing pipe may optionally consist of a plurality of layers which may be combined during extrusion to produce the jacketing pipe. One example thereof is the introduction of multilayered films between the polyurethane foam and the jacketing pipe, wherein the film comprises at least one metallic ply for improving the barrier effect. Suitable jacketing pipes of this type are described in EP 0 960 723 A2. This optionally present additional layer is preferably already introduced together with the film in step (A). According to the invention, for example, multi-ply films comprising aluminum as a diffusion barrier may be employed.

Generally employable according to the invention are all thermoplastics having advantageous properties for a corresponding insulated pipe. Examples of thermoplastics employable according to the invention are selected from the group consisting of polyethylene, polypropylene and mixtures thereof, and preferably polyethylene is used.

The process according to the invention may also comprise further steps. For example the insulated pipe formed may be subjected to further processing, for example by cutting the length of the continuously produced and thus in principle endless insulated pipe into desired lengths, for example into length of 6, 12 or 16 m.

In a particularly preferred embodiment the insulated pipe produced according to the invention is an insulated composite jacketed pipe for underground district heating networks which meets the requirements of DIN EN 253:2015-12.

The present invention further relates to an insulated pipe producible by the process according to the invention. The details of the produced insulated pipe recited in respect of the process according to the invention apply correspondingly. The pipe produced continuously according to the invention features a particularly uniform density distribution over its entire length and consequently also low lambda values coupled with improved physical characteristics. The insulated pipe produced according to the invention simultaneously has a large external diameter of for example 125 to 1400 mm and/or a particularly high bulk density of for example 50 to 300 kg/m$^3$. The pipes according to the invention especially also have a high axial shear strength.

In a further aspect the present invention also relates to an insulated pipe obtainable or obtained in a process as described hereinabove.

In a further embodiment the present invention therefore relates to an insulated pipe as described hereinabove, wherein the axial shear strength between the outerlayer and the polyurethane layer is in the range from 0.05 to 0.50 MPa determined according to DIN EN 253:2015-12.

It has been found that the application of an additional adhesion promoter to the media pipe shortly before application of the insulating foam results in a marked increase in axial shear strength. It was able to be more than doubled from 0.14 to 0.31 MPa. Unless otherwise stated axial shear strength is determined according to DIN EN 253:2015-12 in the context of the present invention.

Further embodiments of the present invention are apparent from the claims. It will be appreciated that the features of the subject matter/processes/uses according to the invention that are mentioned above and elucidated below are usable not only in the combination specified in each case but also in other combinations without departing from the scope of the invention. For example, the combination of a preferred feature with a particularly preferred feature or of a feature not characterized further with a particularly preferred feature etc. is thus also encompassed implicitly even if this combination is not mentioned explicitly.

Illustrative embodiments of the present invention are listed below, but these do not restrict the present invention. In particular, the present invention also encompasses those embodiments which result from the dependency references and hence combinations specified hereinafter.

1. Process for producing insulated pipes comprising the steps of:
   (A) providing a media pipe and a film hose continuously formed from a film or a media pipe and a jacketing pipe, wherein the media pipe is arranged inside the film hose or the jacketing pipe and a slot is formed between the media pipe and the film hose or jacketing pipe, wherein an adhesion promoter has been applied to the surface of the media pipe facing the film hose or the jacketing pipe,
   (B) introducing a polyurethane system at least comprising an isocyanate component (a) comprising at least one isocyanate, a polyol component (b) and at least one catalyst into the slot before the adhesion promoter is fully cured and
   (C) foaming and curing the polyurethane system.
2. Process according to embodiment 1, wherein the adhesion promoter is selected from the group consisting of adhesion promoters based on polyurethanes.
3. Process according to embodiment 1 or 2, wherein the adhesion promoter is a 2-component system.
4. Process according to any of embodiments 1 to 3, wherein the adhesion promoter comprises at least one isocyanate component and one polyol component.
5. Process according to any of embodiments 1 to 4, wherein the adhesion promoter comprises a bulk density determined without solid fillers in the range from 400 to 1200 kg/m$^3$.
6. Process according to any of embodiments 1 to 5, wherein the adhesion promoter is applied by spraying or spread coating.
7. Process according to any of embodiments 1 to 6, wherein the adhesion promoter covers a proportion of the surface of the media pipe facing the film hose or jacketing pipe in the range from 50% to 100% of the surface.
8. Process according to any of embodiments 1 to 7, wherein the polyol component (b) comprises at least one compound selected from the group consisting of chemical blowing agents, crosslinkers, chain extenders, additives and/or physical blowing agents.
9. Process according to any of embodiments 1 to 8, wherein the reaction of the isocyanate component (a) with the polyol component (b) is performed at an index between 95 and 240.
10. Process according to any of embodiments 1 to 9, wherein the material from which the jacketing pipe or the film hose is formed is a thermoplastic.
11. Process for producing insulated pipes comprising the steps of:
   (A) providing a media pipe and a film hose continuously formed from a film or a media pipe and a jacketing pipe, wherein the media pipe is arranged inside the film hose or the jacketing pipe and a slot is formed between the media pipe and the film hose or jacketing pipe, wherein an adhesion promoter has been applied to the surface of the media pipe facing the film hose or the jacketing pipe,
   (B) introducing a polyurethane system at least comprising an isocyanate component (a) comprising at least one isocyanate, a polyol component (b) and at least one catalyst into the slot before the adhesion promoter is fully cured and
   (C) foaming and curing the polyurethane system, wherein the adhesion promoter is selected from the group consisting of adhesion promoters based on polyurethanes.
12. Process for producing insulated pipes comprising the steps of:
   (A) providing a media pipe and a film hose continuously formed from a film or a media pipe and a jacketing pipe, wherein the media pipe is arranged inside the film hose or the jacketing pipe and a slot is formed between the media pipe and the film hose or jacketing pipe, wherein an adhesion promoter has been applied to the surface of the media pipe facing the film hose or the jacketing pipe,
   (B) introducing a polyurethane system at least comprising an isocyanate component (a) comprising at least one isocyanate, a polyol component (b) and at least one catalyst into the slot before the adhesion promoter is fully cured and
   (C) foaming and curing the polyurethane system, wherein the adhesion promoter comprises at least one isocyanate component and a polyol component.
13. Process for producing insulated pipes comprising the steps of:
   (A) providing a media pipe and a film hose continuously formed from a film or a media pipe and a jacketing pipe, wherein the media pipe is arranged inside the film hose or the jacketing pipe and a slot is formed between the media pipe and the film hose or jacketing pipe, wherein an adhesion promoter has been applied to the surface of the media pipe facing the film hose or the jacketing pipe,
   (B) introducing a polyurethane system at least comprising an isocyanate component (a) comprising at least one isocyanate, a polyol component (b) and at least one catalyst into the slot before the adhesion promoter is fully cured and
   (C) foaming and curing the polyurethane system, wherein the adhesion promoter is applied by spraying or spread coating.
14. Process for producing insulated pipes comprising the steps of:
   (A) providing a media pipe and a film hose continuously formed from a film or a media pipe and a jacketing pipe, wherein the media pipe is arranged inside the film hose or the jacketing pipe and a slot is formed between the media pipe and the film hose or jacketing pipe, wherein an adhesion promoter has been applied to the surface of the media pipe facing the film hose or the jacketing pipe,
   (B) introducing a polyurethane system at least comprising an isocyanate component (a) comprising at least one isocyanate, a polyol component (b) and at least one catalyst into the slot before the adhesion promoter is fully cured and
   (C) foaming and curing the polyurethane system, wherein the adhesion promoter covers a proportion of the surface of the media pipe facing the film hose or jacketing pipe in the range from 50% to 100% of the surface.
15. Process for producing insulated pipes comprising the steps of:
   (A) providing a media pipe and a film hose continuously formed from a film or a media pipe and a jacketing pipe, wherein the media pipe is arranged inside the film hose or the jacketing pipe and a slot is formed between the media pipe and the film hose or jacketing pipe, wherein an adhesion promoter has been applied to the surface of the media pipe facing the film hose or the jacketing pipe,
   (B) introducing a polyurethane system at least comprising an isocyanate component (a) comprising at least one isocyanate, a polyol component (b) and at least one catalyst into the slot before the adhesion promoter is fully cured and
   (C) foaming and curing the polyurethane system,
   wherein the adhesion promoter is selected from the group consisting of adhesion promoters based on polyurethanes, wherein the adhesion promoter comprises at least one isocyanate component and a polycomponent, wherein the adhesion promoter is applied by spraying or spread coating and wherein the adhesion promoter covers a proportion of the surface of the media pipe facing the film hose or jacketing pipe in the range from 50% to 100% of the surface.
16. Process according to any of embodiments 1 to 15, wherein the polyol component (b) comprises at least one compound selected from the group consisting of chemical blowing agents, crosslinkers, chain extenders, additives and/or physical blowing agents.
17. Process according to any of embodiments 1 to 16, wherein the reaction of the isocyanate component (a) with the polyol component (b) is performed at an index between 95 and 240.
18. Process according to any of embodiments 1 to 17, wherein the material from which the jacketing pipe or the film hose is formed is a thermoplastic.
19. Insulated pipe obtainable or obtained by a process according to any of embodiments 1 to 18.
20. Insulated pipe according to embodiment 19, wherein the axial shear strength between the outerlayer and the polyurethane layer is in the range from 0.05 to 0.40 MPa determined according to DIN EN 253:2015-12.

CITED LITERATURE

EP 2 435 243 A1
EP 1 516 720 A1

WO 2015/091451 A1
WO 2011/045139 A1
EP 1 141 613 B1
EP 0 865 893 A1
EP 1 777 051 B1
EP 1 595 904 A2
WO 00/39497 A1
WO 01/18087 A1
EP 2 143 539 A1
EP 1 428 848 B1
EP 0 960 723 A2

The invention claimed is:

1. A process for producing insulated pipes, the process comprising the steps of:
- (A) providing a media pipe and a film hose continuously formed from a film or a media pipe and a shell pipe, wherein the media pipe is arranged inside the film hose or the shell pipe and a slot is formed between the media pipe and the film hose or shell pipe,
  - wherein an adhesion promoter has been applied to a surface of the media pipe facing the film hose or the shell pipe;
- (B) subsequently introducing a polyurethane system at least comprising an isocyanate component (a) comprising at least one isocyanate, a polyol component (b), and at least one catalyst into the slot before the adhesion promoter is fully cured; and
- (C) foaming and curing the polyurethane system,
  wherein the adhesion promoter is selected from the group consisting of adhesion promoters including polyurethanes,
  wherein the adhesion promoter has a bulk density, determined without solid fillers, in the range from 400 to 1200 $kg/m^3$, and
  wherein a measure of the axial shear strength between the media pipe and the polyurethane system is in the range from 0.05 to 0.50 MPa.

2. The process according to claim 1, wherein the adhesion promoter is a 2-component system.

3. The process according to claim 1, wherein the adhesion promoter comprises at least one isocyanate component and one polyol component.

4. The process according to claim 1, wherein the adhesion promoter is applied by spraying or spread coating.

5. The process according to claim 1, wherein the adhesion promoter covers a proportion of the surface of the media pipe facing the film hose or shell pipe in the range from 50% to 100% of the surface.

6. The process according to claim 1, wherein the polyol component (b) comprises at least one compound selected from the group consisting of chemical blowing agents, crosslinkers, chain extenders, additives, and physical blowing agents.

7. The process according to claim 1, wherein the reaction of the isocyanate component (a) with the polyol component (b) is performed at an index in the range from 95 to 240.

8. The process according to claim 1, wherein the shell pipe or the film hose consists of a thermoplastic.

* * * * *